Dec. 18, 1928. Re. 17,167

W. H. WELCH

RIM CONTRACTING DEVICE

Original Filed June 20, 1923 2 Sheets-Sheet 1

Inventor.
Walter H. Welch.
by his Attorneys.
Howson & Howson

Dec. 18, 1928. Re. 17,167

W. H. WELCH

RIM CONTRACTING DEVICE

Original Filed June 20, 1923 2 Sheets-Sheet 2

Inventor.-
Walter H. Welch.
by his Attorneys.-
Howson & Howson

Reissued Dec. 18, 1928. Re. 17,167

UNITED STATES PATENT OFFICE.

WALTER HENRY WELCH, OF BRISTOL, ENGLAND.

RIM-CONTRACTING DEVICE.

Original No. 1,533,073, dated April 7, 1925, Serial No. 646,633, filed June 20, 1923. Application for reissue filed May 26, 1925. Serial No. 33,061.

This invention is for improvements in or relating to devices for contracting the tire-carrying rims of the wheels of motor and other vehicles, and has for its object to provide an improved construction of device which can be used with any of the known kinds of detachable split rims.

As is well known, the operation of removing a tire from a split rim is effected by displacing the two ends of the rim and bringing one end inside the other by a circumferential movement. Devices which has been used for this purpose hitherto have been disadvantageous in two respects, firstly that they have gripped both edges of the rim, the clamping-member pivots extending through the rim, and secondly, that they have gripped the rim at points more or less distant from the cut in the rim. The disadvantage of the first feature mentioned is that the shape and situation of the gripping-devices virtually increases the radial thickness of the rim, and thereby renders it necessary to strain it to a greater extent than would be necessary merely to bring one end of the rim clear of the other in a radial direction. The disadvantage of the second feature is that when the gripping devices are spaced away from the cut in the rim, the rim is strained over only a portion of its circumferential length, with the result that this portion is strained to a greater extent than would be necessary if the strain were distributed over the whole length of the rim.

The present invention has for its object to provide a rim-contracting device in which both these difficulties are avoided.

According to this invention a rim-contracting device comprises the combination of a pair of gripping devices adapted to be secured on one edge of the rim and to extend away laterally therefrom, one at each side of the cut in the rim, and in close proximity to it, and rigid guiding means whereby one gripping-device can be caused to travel in a substantially circular path around the other in a plane parallel to that of the rim, for the purpose of contracting the rim.

Preferably the gripping-devices aforesaid are connected together by a link which pivotally engages each of them, and which may be provided with an extension to constitute the operating lever for the device.

In some instances it is desirable to make provision for slightly expanding a rim, to break the joint, or to effect the disengagement of locking devices on it, and for this purpose the pivotal engagement of the link with the gripping-devices aforesaid may in one case be constituted by a pin in a slot. According to another feature of this invention, the slot for one gripping-device may be shaped other than concentrically with the pivotal axis on the other gripping-device, so that movement of the link in such a manner as to traverse the pin along the slot causes the desired expansion of the rim. Other features of the invention will be described with reference to a specific construction which will now be given by way of example of this invention.

In the accompanying drawings which illustrate one embodiment of this invention:

Like reference characters indicate like parts throughout the drawings.

Figure 3:
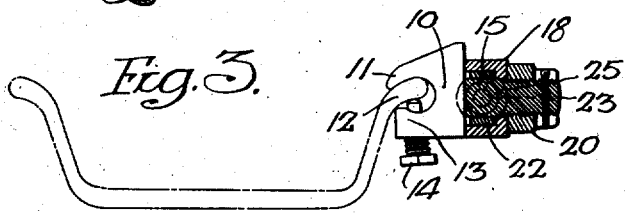
Fig. 3 is an end view partly in section to show the method of mounting the gripping-devices or clamps.

The gripping-devices 10 or clamps, which are used to grip the rim, are in the form of hooks, as shown most clearly in Figure 3, being shaped as at 11 to hook over the edge of a detachable rim 12. These hooks can be readily engaged with the edge of the rim 12, as it is necessary to effect only a slight displacement, if any, of the side of the tire away from the rim. In the portion 13 of the clamp, which corresponds to the shank of an ordinary hook, there is mounted a set-screw or clamping-screw 14 which is in line with a portion of the inner surface of the hook 11, which portion is directed more or less outwards away from the rim towards the closed side of the hook. With this construction and arrangement of the parts, the screwing-in of the clamping-screw 14 grips the edge of the rim 12 between it and the hook 11 and causes a relative wedging movement, whereby the hook is drawn further onto the rim and thereby provides a very secure grip on it.

This clamp or gripping-member 10 is provided with a pin 15 which extends laterally substantially parallel with the axis of rotation of the rim, and in a direction away from the plane of the rim when the clamp is secured thereon. The whole clamp is so proportioned that its radial thickness when secured upon the rim is as small as possible, for the purpose hereinafter set forth.

A second clamp, indicated generally by the reference 16, is similar to the clamp 10, and these two clamps are mounted in a bar or link 18, the clamp 16 having its pin 17 journaled in a round hole in this bar, and the clamp 10 having its pin 15 journaled in a slot 19. They are secured in this link by means of nuts 20, 21, screwed onto the respective pins 15, 17. The areas of contact or bearing surfaces between the clamps and link are sufficiently extended to maintain the operative relation of the parts and the pins are preferably so rotatably mounted in the link as to substantially eliminate play tending to affect the parallel relation of their rotational axes, the tool as a whole being in this respect a substantially rigid one. In the present instance, the clamps, link and nuts are so shaped as to provide an adequate bearing area in a plane parallel to that of the rim so as to insure the two clamps being maintained in the same plane when the link is moved. This bearing area, as will be seen from Figure 3, is constituted by the shoulders on the clamps surrounding the pins.

Figure 4:
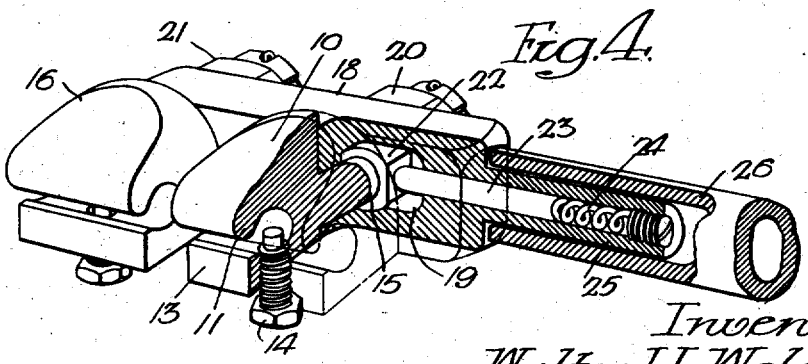
Fig. 4 is a perspective view with parts broken away to show the construction of the complete device.

The slot 19 in the construction illustrated is arranged with its length lying in the line joining the centres of the pins 15, 17, and provision is made for maintaining the pin 15 at that end of its slot 19 nearest to the pin 17. As illustrated in Figure 4, the pin 15 is free to slide in the slot 19, and there is provided a pin 23 which can slide in an axial bore in the link 18. This pin 23 has a head 22 whereby it engages the pin 15 and a compression spring 24 operates endwise on the pin 23 to press the pin 15 towards that end of the slot 19 which is nearest the clamp 16.

Figure 1:
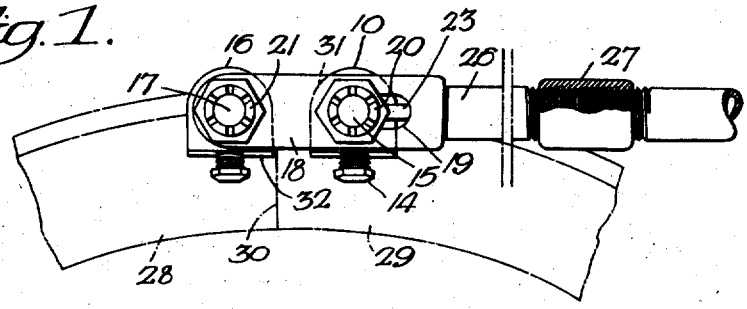
Figures 1 and 2 are side elevations showing the device as applied to a rim, in two different positions.

One end of the link 18 is extended to receive an operating handle; conveniently this extension-piece 25 is cylindrical in shape, to receive a tubular handle 26 of any desired length. Preferably this handle 26 is of simple tubular construction, and is made in two parts secured together by a readily detachable coupling 27, as shown in Fig. 1. This construction is adopted in order to permit the whole device to be dissembled and packed into a suitable case having a small overall length, whilst at the same time providing an adequate length of lever for operating the device.

Figure 2:
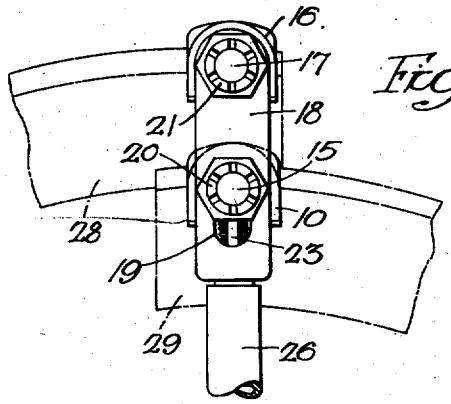

In the use of this device, the two clamps are affixed to the rim, one on each side of the cut therein, as shown in Figure 1, the ends of the rim being indicated diagrammatically at 28, 29, and the cut between the ends at 30. Preferably one of the clamps is arranged immediately adjacent the cut. Thus, for example, the clamp 16 is first fixed in place close to the cut 30 in the rim, and the other clamp 10, which is pressed towards the left in Figure 1, by the spring 24, is gripped onto the rim. If it is necessary to break the joint in the rim for any purpose, this is readily effected by inserting a chisel directly in the joint and levering the ends apart; this endwise movement is permitted without disturbing the clamps, by the slot 19. The operating handle is then swung around so as to carry one clamp in a substantially circular path around the axis of the other, as shown in Figure 2, and this movement separates the two ends of the rim, firstly by a movement substantially radially of the rim and then by a circumferential movement, so that they are overlapped, and the rim is contracted to such an extent that the tire can be readily removed from it. It will be appreciated that the depth of the clamps measured radially of the rim has to be kept to a minimum, since one is carried across the radial line of the other. Moreover, the upper surface of the clamps is rounded as shown at 31 in Figure 1 in order to clear the lower corner 32. It is found in practice, however, that the said radial depth of the clamps can be kept so small that the movement required to take one end of the rim clear of the other end is sufficient also to clear the clamps. This is of great practical importance, as it insures that the rim is strained as little as possible in contracting it, and this beneficial effect is further enhanced by the situation of the two clamps closely to one another, since practically the whole circumferential length of the rim is utilized when straining it.

Instead of arranging the slot with its length lying in the line joining the axes of the pins 15, 17, it may be inclined thereto, for example nearly at right-angles so that the first part of the swinging movement of the link 18 causes the movement of the pin 15 in the slot by a cam-like or wedging action which is arranged to separate the two ends of the rim to give a preliminary opening movement to the rim, if so desired. This construction is illustrated in Figs. 5 and 6, whereof Fig. 5 shows the rim-tool when first applied to the rim, and Fig. 6 shows the same parts after an initial movement has been imparted to the link for the purpose of opening the gap in the rim.

Figure 5:
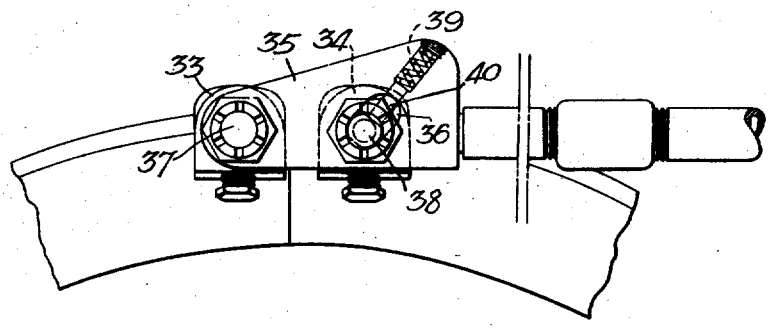
Fig. 5 is a view similar to Fig. 1 of a modified construction.
Figure 6:
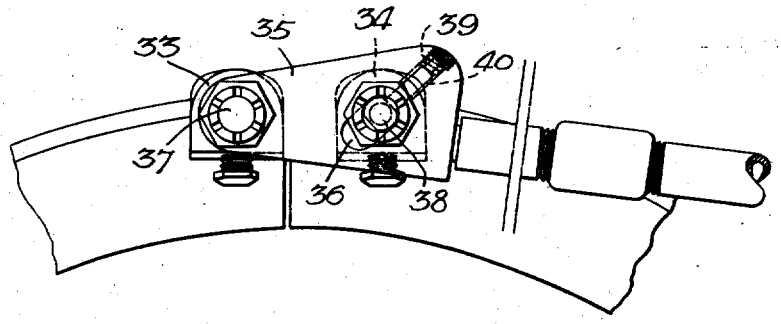
Fig. 6 is a view showing the parts of Fig. 5 in a slightly different position.

Referring to Figure 5 the clamping members 33, 34 are similar to those previously described, but the link 35 is provided with a slot 36 which is inclined to the line joining the centers of the pins 37, 38 on the clamps. The pin 38 engages with this slot, and there is provided a compression spring 39 operative through a plunger 40 on the pin 38 to retain it normally at that end of the slot 36 which is nearest to the pin 37. The inclination aforesaid of the slot 36 is such that when the link 35 is swung about the pin 37 in the direction for contracting the rim, the side of the slot exerts a cam-like or wedging effect on the pin 38 causing it to move away from the pin 37. The position of the parts when the two pins have been thus separated is illustrated in Figure 6; since the clamping devices 33, 34 are secured on the respective ends of the rim, this separating movement of the clamping devices causes a gap to be opened between the two ends of the rim and thereby facilitates the subsequent contraction. This subsequent contraction is effected by continued movement of the link 35 in the same direction so that the initial opening of the rim is provided for automatically. Alternatively, a second link or plate could be arranged to engage the two clamps, lying beside the link 18, and this second link could have a cam-like or wedging slot for the same purpose. The operating lever could in this construction be applied first to the auxiliary plate or link to provide the expanding movement and then transferred to the second link to effect the contraction of the rim.

It will be seen that a characteristic feature of the rim-contracting device hereinbefore described is that the clamps or gripping-members are affixed to one edge of the rim only, as shown most clearly in Figure 3, and lie only on that side of the rim, so that no part of them extends through the rim from one side to the other. This gives the special advantage hereinbefore referred to, that the radial movement which must be imparted to one end of the rim to clear the other end is reduced to a minimum. It also lies within the scope of the invention, however, to use a device as above described on each edge of the rim, for example, when a large or stout rim has to be contracted. The clamps on each side of the rim, however, are not connected together, so that the characteristic feature aforesaid is retained. The clamps when mounted on each edge of the rim may be operated independently but simultaneously, by means of two separate levers, one on each side, or a single forked lever may be arranged to engage with both pairs of clamps to effect their operation.

I claim:

1. In a rim tool, the combination of a pair of gripping devices adapted to be secured on one edge of a rim and to extend away laterally therefrom, a pin extending laterally from each of said gripping devices, a link having rotative engagement with one of said pins and having a slot for the reception of the other of said pins, a compressing spring normally maintaining said pin at that end of the slot nearest the other of said pins, and means for swinging said link angularly about said pins.

2. In a rim-tool, the combination of a pair of gripping devices adapted to be secured on one edge of a rim and to extend away laterally therefrom, a pin extending laterally from each of said gripping devices, a link having rotative engagement with one of said pins, and having a slot formed therein, a sleeve having rotative engagement with the second of said pins, and having sliding engagement with said slot, a compressing spring operative along the length of the link on said sleeve and normally maintaining it at one end of said slot and means for swinging said link angularly about said pins, substantially as described.

3. In a rim-tool, the combination of a pair of gripping devices adapted to be secured on a split rim adjacent the split therein, said devices each comprising a pin extending laterally therefrom, and a shoulder normal to said pin, a link rotatably carrying said pins and bearing on said shoulders, means for holding said link closely against said shoulders and means for swinging said link relatively to said pins, substantially as set forth.

4. In a rim tool, the combination of a pair of gripping devices adapted to be secured on a split rim adjacent the split therein, said devices each comprising a pin extending laterally therefrom, and a shoulder normal to said pin, a link bearing on said shoulders and having rotative engagement with one of said pins, and having a slot formed in it whereof the length is inclined to the line joining the centres of said pins, said slot providing sliding engagement with the second of said pins, resilient means normally maintaining said second pin at one end of said slot, and means for swinging said link angularly about the first of said pins, substantially as described.

5. In a rim tool, the combination of a pair of gripping devices each comprising a hook-shaped member adapted to be engaged with the edge of the rim, a locking screw in said member so positioned as to be in line with a portion of the inner surface of the free end of the hook, which portion is directed towards the closed side of the hook, said devices each comprising a pin extending laterally therefrom, and a shoulder normal to said pin, a link rotatably carrying said pins and bearing on said shoulders, means for holding said link closely against said shoulders and means for swinging said link relatively to said pins, substantially as set forth.

WALTER HENRY WELCH.